July 31, 1923.  
E. J. ZIEGLER  
GEARLESS DIFFERENTIAL TRANSMISSION MECHANISM  
Filed Oct. 4, 1922  
1,463,356  
2 Sheets-Sheet 1
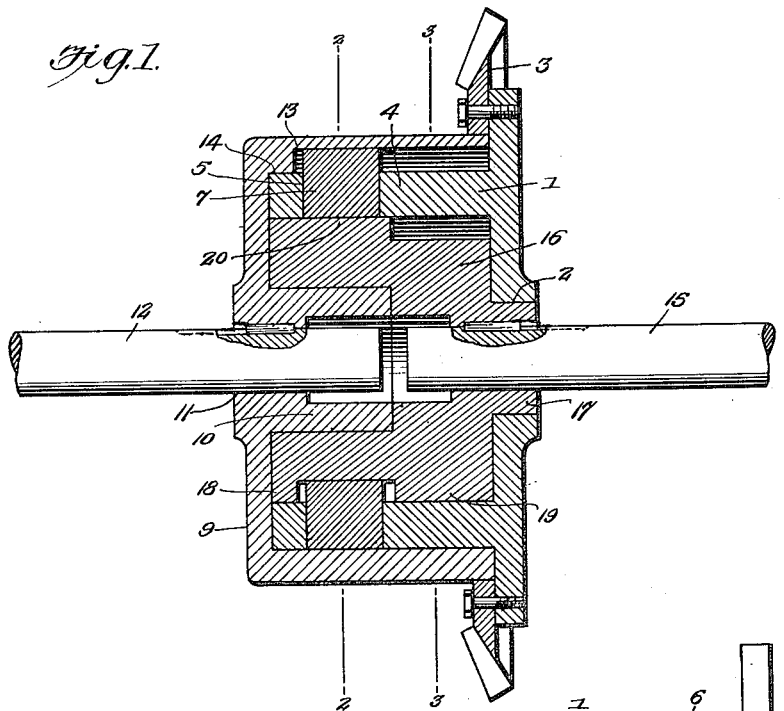
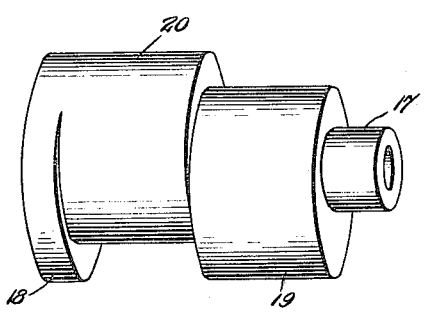
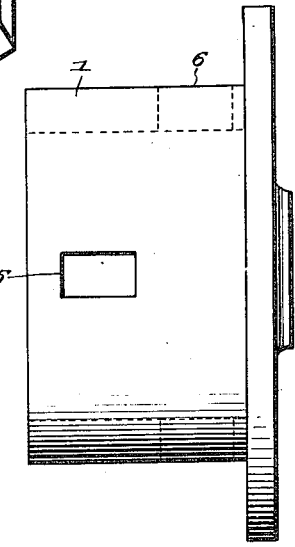

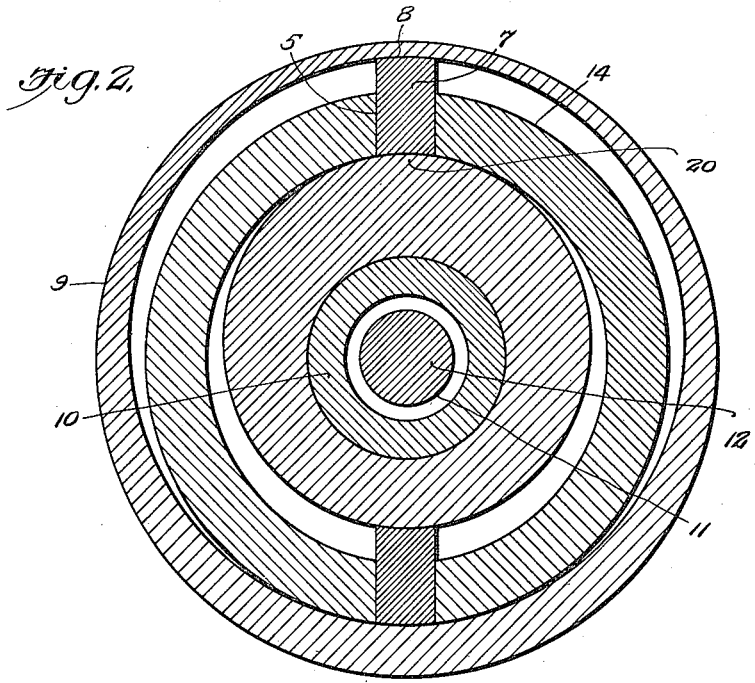
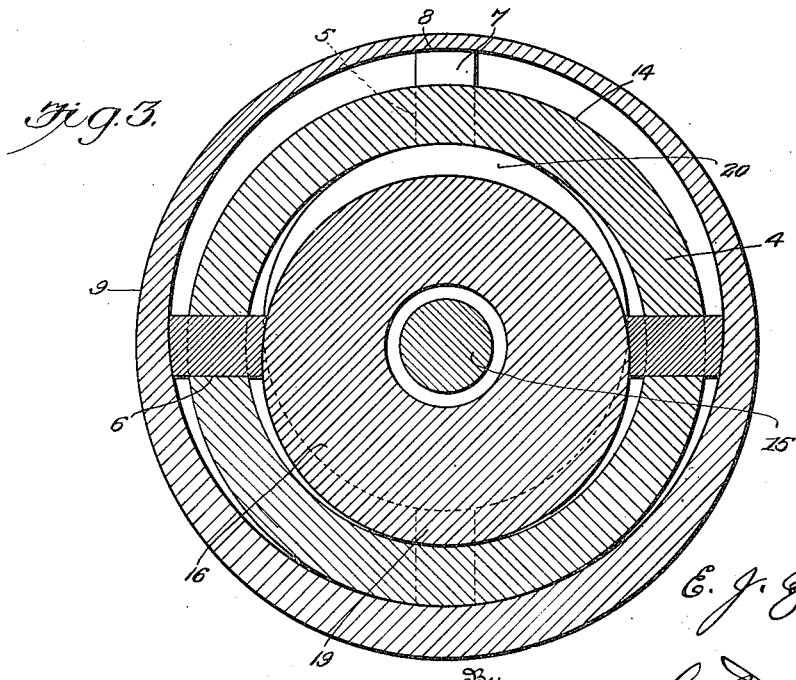

Patented July 31, 1923.

1,463,356

UNITED STATES PATENT OFFICE.

EVERETT J. ZIEGLER, OF HARTFORD CITY, INDIANA.

GEARLESS DIFFERENTIAL TRANSMISSION MECHANISM.

Application filed October 4, 1922. Serial No. 592,268.

*To all whom it may concern:*

Be it known that I, EVERETT J. ZIEGLER, a citizen of the United States, residing at Hartford City, in the county of Blackford and State of Indiana, have invented certain new and useful Improvements in Gearless Differential Transmission Mechanism, of which the following is a specification.

This invention relates to gearless differential transmission mechanism and it consists in the novel features hereinafter described and claimed.

An object of the invention is to provide a differential of the character stated so constructed that when installed between the two rear wheels of a motor driven vehicle it will eliminate the breakage and wear incident to the difference in the rate of speed at which the two wheels rotate when the machine is turning out of a straight course or when it is passing over an uneven roadway.

A further object of the invention is to provide a structure of the character stated which includes a minimum number of working parts.

A still further object of the invention is to provide such a structure which will not permit one wheel to spin while the other stands still, as is frequently caused by uneven roadways and thereby saving wear on the tires which is usually caused by bounding and by stalling in mud or sand. The parts of the differential are so arranged that they automatically and promptly interlock and pull with equal power at both ends of the axle when the obstructing conditions are encountered.

A still further object of the invention is to so arrange the elements and features thereof that when the pulling or propelling power is applied to both wheels there are five rigid bearings within the differential structure. This makes the differential structure strong and rigid in its action and eliminates all excessive wear and breakage.

In the accompanying drawings:—

Figure 1 is a transverse sectional view of the gearless differential.

Figure 2 is a sectional view thereof taken on the lines 2—2 of Figure 1.

Figure 3 is a similar view taken on line 3—3 of Figure 1.

Figure 4 is a perspective view of an eccentric member used in the differential.

Figure 5 is a side elevation of one of the members of the differential.

As illustrated in the accompanying drawings the gearless differential structure comprises a barrel member 1, which is partially closed at one end and which is provided at its center with a bore 2, which passes through the closure located at the said partially enclosed end. A gear ring 3 is attached to the peripheral portion of the member 1. The side wall 4 of the member 1 is circular and concentrically positioned with relation to the bore 2. The side wall 4 is provided with rectangular openings 5 and 6. The openings 5—5 are located opposite each other and the openings 6—6 are located opposite each other. The openings 5 are positioned in the vicinity of one end of the wall 4 and the openings 6 are positioned in the vicinity of the opposite end of the wall 4. The openings 5 are aligned at a right angle to the openings 6. Wedge blocks 7 are slidably mounted in the openings 5 and 6 and the said blocks are greater in length than the transverse thickness of the wall 4. The blocks 7 are rounded at their outer end as at 8. A casing member 9 is provided at its center with a hub 10 having a centrally located bore 11 which receives the end portion of an axle shaft section 12 and to which the member 9 is fixedly attached. The side wall of the member 9 is provided with an eccentrically positioned bore or surface 13 and the edge of the side wall of the member 9 lies directly against the side of the member 1 and the side wall of the member 1 extends across the bore 13 and its inner end is snugly received in a concentric bore 14 provided at the inner side of the body of the member 9. An axle shaft section 15 is aligned longitudinally with the shaft section 12 and an eccentric head 16 is mounted upon and fixed to the end portion of the axle shaft section 15. The head 16 is provided with a hub 17 which is mounted upon and fixed to the shaft section 15 and which fits snugly in the bore 2 of the member 1. One end of the head 16 bears directly against the inner face of the member 1 and the outer end of the head 16 is flush with the edge of the side wall of the member 1. The head 16 is provided at that face opposite the face thereof which carries the hub 17 with a circular shoulder 18 the outer edge of which is concentric with relation to the axes of the shaft section 12 and 15 and the inner surface of the side wall of the member 1. The head 16 is provided with eccentric portions 19 and 20. The deep portions of the eccentric 19 and 20 are disposed from the axis of the head 16 in opposite directions and the outermost surface of the eccentric 20 is flush with the periphery of the shoulder 18 as best shown in Figure 4 of the drawings. The eccentric 19 is located between the blocks which are held in the openings 6—6 of the side wall of the member 1. The eccentric portion 20 of the head 16 is located between the blocks 7 which are slidably held in the openings 5 of the side wall of the member 1.

In operation the power is applied through the gear ring 3 to the member 1 whereby the said member 1 is rotated and the blocks 7 are carried around the axes of the shaft sections 12 and 15. The inner ends of the block 7 are engaged successively by the surfaces of the deep portions of the eccentrics 19 and 20 and the said blocks 7 are moved outwardly in the side wall of the member 1 until the outer rounded surfaces 8 of the said blocks come in contact with the eccentric surface 13 of the side wall of the casing 9. That is to say the blocks 7 are moved over the eccentric portions 19 and 20 until they form positive connection between the member 9 and the head 16 and inasmuch as the member 1 is being rotated, rotary movement is transmitted through those blocks 7 which are confined to the head 16 and the casing member 9. In view of the fact that the head 16 and the casing member 9 are fixed to the axle shaft sections 15 and 12 respectively the said shaft sections are rotated in one direction and in unison. The purpose of the arrangement is to compel the shafts to turn whenever the casing turns but to permit one shaft to overrun the other in case of turning of the vehicle. This operation is the same if the vehicle to which the device is applied is moving in a forward direction or is backing.

Having described the invention, what is claimed is:—

1. A differential mechanism comprising in combination with aligned shaft sections a head member fixed to one shaft section and provided with oppositely disposed eccentrics and having a shoulder provided with a concentric peripheral surface, a barrel member receiving the head and having its side wall provided with openings some of which are opposite one of the eccentrics of the head and others opposite the other eccentric portion of the head, blocks slidably mounted in the openings, a casing member fixed to the other shaft section and having a side wall which receives the blocks, the said side wall being provided with an eccentric interior surface.

2. A differential mechanism comprising in combination with aligned shaft sections a head member having a hub portion which is fixed to one of the shaft sections the head member being provided with oppositely disposed eccentric portions and having a shoulder provided with a concentric peripheral surface, a barrel member journaled upon the hub portion of the head member and provided at its side with several sets of openings aligned at right angles to each other, one set of openings being opposite one eccentric portion of the head and the other set of openings being opposite the other eccentric portion of the head, the concentric surface of the shoulder of the head fitting snugly against the inner surface of the wall of the barrel member, blocks slidably mounted in the openings of the wall of the barrel member and a casing member fixed to the other shaft section and having a side wall provided at its inner surface with an eccentrically disposed surface adapted to be engaged by the outer edge of the block.

3. A differential gear mechanism in combination with aligned shaft section comprising a head member fixed to one shaft section and having oppositely disposed eccentric portions and provided with a shoulder having a concentrically positioned peripheral surface, a barrel member journaled upon the head member and provided at its side wall with openings, blocks slidably mounted in the openings and adapted to be engaged by the eccentric portions of the head, a casing member fixed to the other shaft section and having a hub which is journaled in the head member and provided at its inner face with a circular concentric bore which receives the end portions of the side wall of the barrel member, the side wall of the casing member being provided with an eccentrically disposed surface adapted to be engaged by the outer end of the blocks.

In testimony whereof I affix my signature.

EVERETT J. ZIEGLER.